(12) United States Patent
Neeli et al.

(10) Patent No.: US 11,540,142 B2
(45) Date of Patent: Dec. 27, 2022

(54) AI-ARRP (ARTIFICIAL INTELLIGENCE ENABLED AUTOMATIC RADIO RESOURCE PROVISIONING) FOR STEERING WIRELESS STATIONS ON 6 GHZ SPECTRUM CHANNELS ON WIRELESS DATA COMMUNICATION NETWORKS

(71) Applicant: Fortinet, Inc., Sunnyvale, CA (US)

(72) Inventors: Srinivasa Subbarao Neeli, Bangalore (IN); Sudheer Nagurla, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 223 days.

(21) Appl. No.: 17/060,069

(22) Filed: Sep. 30, 2020

(65) Prior Publication Data

US 2021/0195428 A1    Jun. 24, 2021

Related U.S. Application Data

(63) Continuation-in-part of application No. 16/724,334, filed on Dec. 22, 2019, now Pat. No. 11,057,304.

(51) Int. Cl.
| | |
|---|---|
| *H04W 24/08* | (2009.01) |
| *G06N 5/02* | (2006.01) |
| *H04W 16/10* | (2009.01) |
| *H04W 16/14* | (2009.01) |
| *H04W 48/16* | (2009.01) |
| *H04B 17/318* | (2015.01) |
| *H04W 84/12* | (2009.01) |
| *H04W 72/04* | (2009.01) |
| *H04W 88/08* | (2009.01) |

(52) U.S. Cl.
CPC .......... *H04W 16/10* (2013.01); *H04B 17/318* (2015.01); *H04W 16/14* (2013.01); *H04W 48/16* (2013.01); *H04W 72/0453* (2013.01); *H04W 84/12* (2013.01); *H04W 88/08* (2013.01)

(58) Field of Classification Search
CPC ..... H04W 16/10; H04W 48/16; H04W 84/12; H04W 88/08; H04W 48/20; H04W 16/14; H04W 72/0453; H04B 17/318
See application file for complete search history.

(56) References Cited

U.S. PATENT DOCUMENTS

| | | | |
|---|---|---|---|
| 9,288,844 B1* | 3/2016 | Akhavan-Saraf ... | H04W 72/082 |
| 10,812,992 B1* | 10/2020 | Tran ....................... | H04W 16/28 |
| 11,374,876 B2* | 6/2022 | Joseph ................... | H04L 41/16 |
| 2008/0102845 A1* | 5/2008 | Zhao ................... | H04W 72/085 |
| | | | 455/450 |
| 2018/0267832 A1* | 9/2018 | Biener ................. | G06F 9/5061 |
| 2019/0081958 A1 | 3/2019 | Lee | |

(Continued)

*Primary Examiner* — Brian D Nguyen
(74) *Attorney, Agent, or Firm* — Law Office of Dorian Cartwright; Dorian Cartwright (57) ABSTRACT

Muted 6 GHz stations on the Wi-Fi network within the plurality of stations on a first access point within the plurality of access points are assigned to a first access point from the plurality of access points associated with a list of non-overlapping 6 GHz channels, responsive to an RSSI value between the at least one 6 GHz station and the first access point. To do so, a channel switch announcement is unicast to the at least one muted 6 GHz station. The channel switch announcement is associated with a non-overlapping 6 GHz channel of the first access point. The remaining stations connected to the first access point are deauthenticated.

8 Claims, 5 Drawing Sheets

(56) References Cited

U.S. PATENT DOCUMENTS

| | | |
|---|---|---|
| 2019/0320069 A1 | 10/2019 | Ku |
| 2020/0007457 A1* | 1/2020 | Greenstein |
| 2020/0110761 A1* | 4/2020 | Cooper ................. G06N 5/022 |
| 2020/0236219 A1 | 7/2020 | Ku |
| 2020/0274848 A1 | 8/2020 | Sundararajan |
| 2020/0364510 A1* | 11/2020 | Castinado ............. H04L 9/3226 |
| 2021/0067446 A1 | 3/2021 | Ignatchenko |
| 2021/0067455 A1 | 3/2021 | Lahtiranta |
| 2021/0092005 A1 | 3/2021 | Kaul |

* cited by examiner

AI-ARRP (ARTIFICIAL INTELLIGENCE ENABLED AUTOMATIC RADIO RESOURCE PROVISIONING) FOR STEERING WIRELESS STATIONS ON 6 GHZ SPECTRUM CHANNELS ON WIRELESS DATA COMMUNICATION NETWORKS

RELATED APPLICATIONS

This application is a continuation-in-part of U.S. application Ser. No. 16/724,334, filed on Dec. 22, 2019, now U.S. Pat. No. 11,057,304, which is incorporated herein by reference in its entirety.

FIELD OF THE INVENTION

The invention relates generally to computer networking, and more specifically, to using artificial intelligence for dynamically steering stations with 6 GHz spectrum capability on wireless data communication networks to best spectrum available on Wi-Fi across access points.

BACKGROUND

Virtual reality, augmented reality, 4 k video, gaming and other data network supported applications work best with multi-gigabit wireless network support.

The latest WLAN (wireless local access network) standard promulgated by the Institute for Electronic and Electrical Engineers, Wi-Fi 6E, operates on the 6 GHz band as well as the 5 GHz band but offers additional non-overlapping channels. This is an improvement to IEEE 802.11AX (also known as Wi-Fi 6E and HEW, High-Efficiency Wireless), which provides 160 MHz channel bandwidth for high throughput wireless stations using 1024 QAM (quadrature amplitude modulation) enabled transmissions, with low latency in dense environments. But 5 GHz only two operational channels are available with 160 MHz bandwidth capacity, channels 36 through 64 and channels 100 through 128. Under 36/160 MHz bandwidth, channels 52 to 64 (i.e., 5250 MHz to 5330 MHz), and under 100/160 MHz (i.e., 5490 MHz to 5730 MHz) are all DFS enabled.

While 6 GHz devices are backwards compatible to 5 GHz networks, the opposite is not true, as 5 GHz devices can only operate in the 5 GHz spectrum due to older hardware. Problematically, 6 GHz devices often get stuck on access points operating in 5 GHz mode to serve 5 GHz devices as the lowest common denominator. Current DFS provides no logic or intelligence for providing stations with maximum available bandwidth capacity.

Therefore, what is needed is a robust technique for using artificial intelligence to dynamically steer stations with 6 GHz spectrum capability based on spectrum availability across access points of a wireless network.

SUMMARY

These shortcomings are addressed by the present disclosure of methods, computer program products, and systems for using artificial intelligence for dynamically steering stations with 6 GHz spectrum capability, based on spectrum availability and spectrum capability.

In one embodiment, a list of non-overlapping 6 GHz channels available on the Wi-Fi network for the plurality of access points is received. At least one 6 GHz station that is muted on the Wi-Fi network within the plurality of stations on a first access point within the plurality of access points is detected. The first access point is also capable of 6 GHz but is has downshifted to operate as 5 GHz or 2.4 GHz due to servicing at least one non-6 GHz station. RSSI measurements is received for neighboring access points to the at least one 6 GHz station.

In another embodiment, the at least one 6 GHz station is assigned to a first access point from the plurality of access points associated with list of non-overlapping 6 GHz channels, responsive to an RSSI value between the at least one 6 GHz station and the first access point. To do so, a channel switch announcement is unicast to the at least one muted 6 GHz station. The channel switch announcement is associated with a non-overlapping 6 GHz channel of the first access point. The remaining stations connected to the first access point are deauthenticated.

Advantageously, network performance is improved with higher bandwidth connections for stations. Additionally, the performance of 6 GHz devices is also improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for using artificial intelligence for using artificial intelligence for dynamically steering stations with 6 GHz spectrum capability, based on spectrum availability and spectrum capability. One of ordinary skill in the art will recognize many additional variations made possible by the succinct description of techniques below. For example, although Wi-Fi referred to throughout this document, the same principles can be extended to Bluetooth or hybrid wireless data communication channels.

I. Systems for Artificially Intelligent Spectral Frequency Selection (FIG. 1-2)

Figure 1A:
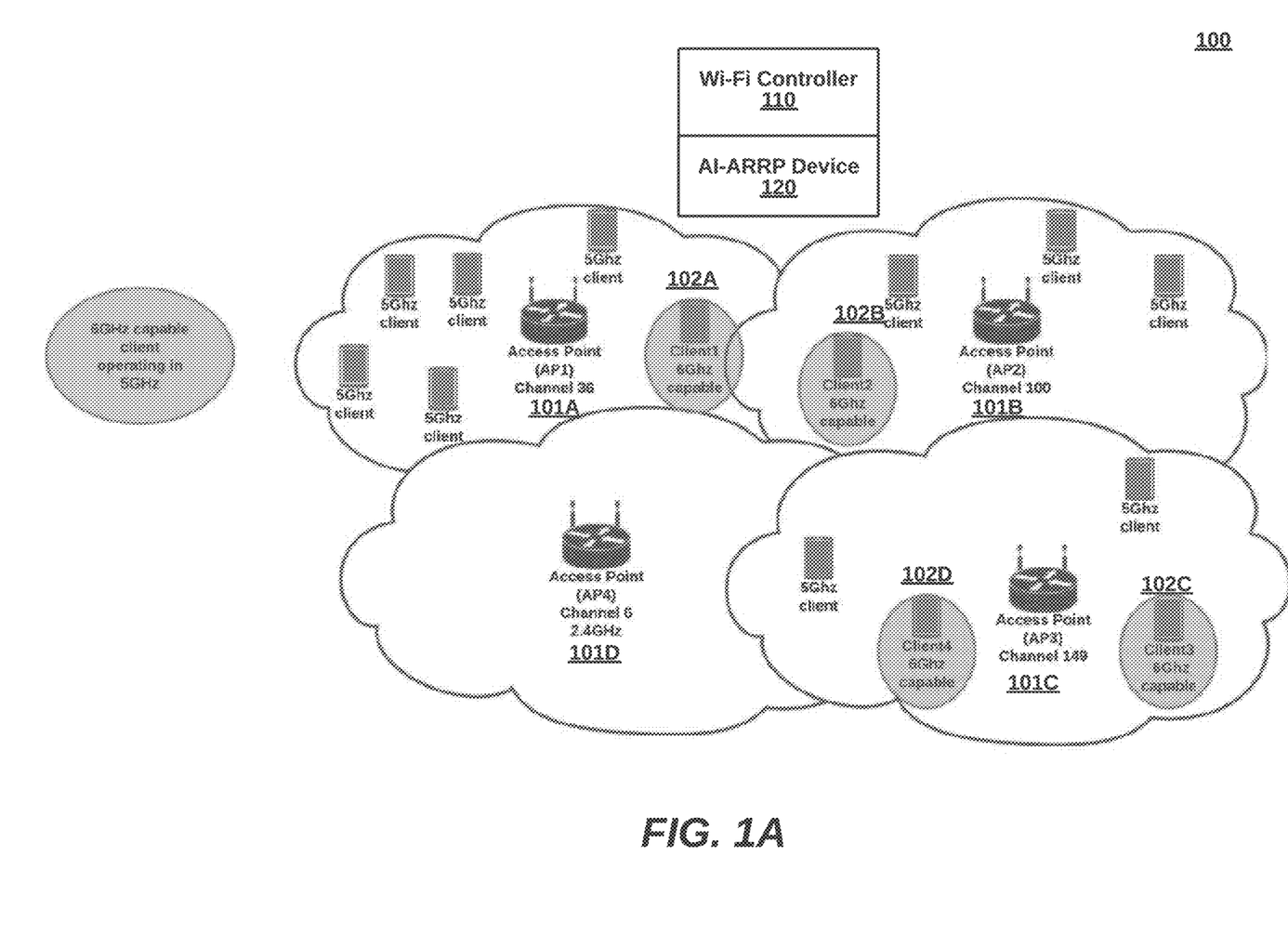
FIGS. 1A, 1B are high-level block diagrams illustrating a system for using artificial intelligence for dynamically steering stations with 6 GHz spectrum capability based on spectrum availability, over different snapshots in time, according to one embodiment.
Figure 1B:
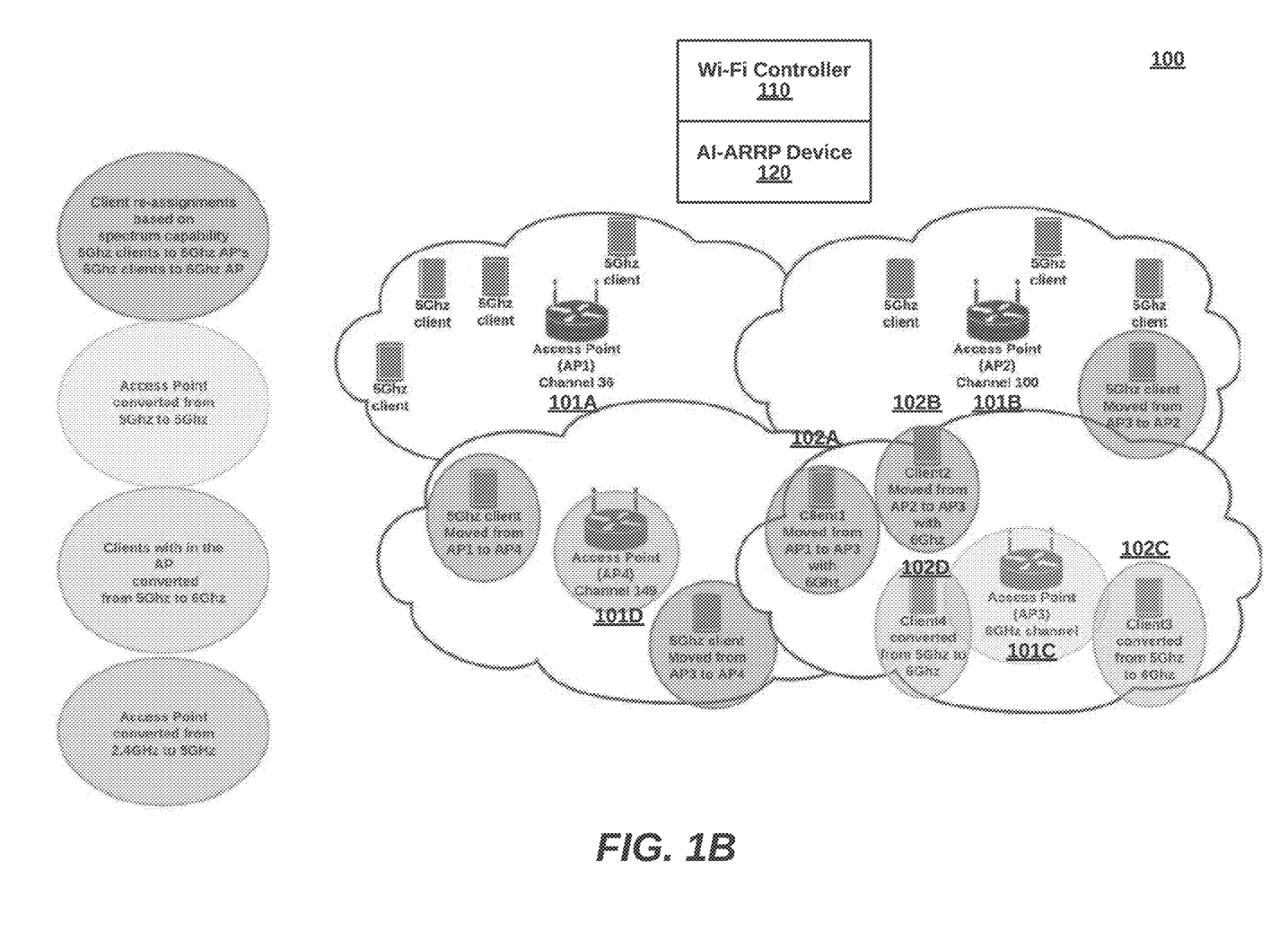
Figure 2:
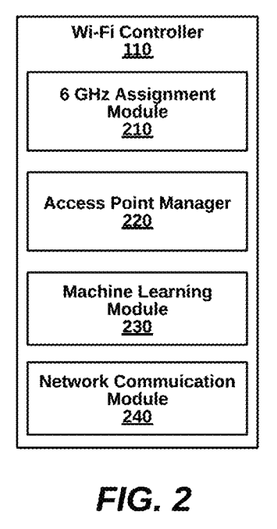
FIG. 2 is a more detailed block diagram illustrating an access point of the system of FIG. 1, respectively, according to one embodiment.

FIGS. 1A-1B are high-level block diagrams illustrating a system 100 for using artificial intelligence for dynamically steering stations with 6 GHz spectrum capability based on spectrum availability, according to one embodiment. The system 100 includes a Wi-Fi controller 110, an AI-ARRP device 120, access points 101A-D, and stations 102A-D, coupled through a wide area network. Many other embodiments are possible, for example, with more access points, more or fewer stations, additional components, such as firewalls, routers, switches, and the like. Hardware and software components can be implemented similar to the example of FIG. 4.

The wide area network links components of the system 100 with a channel for data communication. The Wi-Fi controller 110, the AI-ARRP device 120, and the access point 101A-D are preferably connected to the wide area network via hardwire. The stations 102A-D are wirelessly connected to the access points 101A-D to access the wide area network indirectly. The wide area network can be a data communication network such as the Internet, a WAN, a LAN, WLAN, can be a cellular network (e.g., 3G, 4G, 5G or 6G), or a hybrid of different types of networks. Thus, the system 100 can be a LAN or include cloud-based devices.

In one embodiment, the Wi-Fi controller 110 distributes stations 102A-D among access points 101A-D with logic taking bandwidth capability of both stations and access points into consideration (e.g., see FIG. 1B). In another embodiment, downgraded 6 GHz stations are operating on a first access point (e.g., see 102A, 102B, 102C, 102D in FIG. 1BA), so the Wi-Fi controller 110 steers the downgraded 6 GHz station to a second access point that has available 6 GHz channel and spectrum is no longer downgraded (e.g., 102A, 102B), while others are upgraded in spectrum at the same access point (e.g., 102C, 102D). In yet another embodiment, a change in bandwidth channel availability is detected by the AI-ARRP 120 through information shared with the Wi-Fi controller 110. As shown in FIGS. 1A and 1B in succession, stations can be rearranged to different access points based on the spectral capabilities of the stations and access points after downgrades. In one embodiment, the Wi-Fi controller 110 tracks updates in status for the muted 6 GHz devices and empty 6 GHz access point, to detect available spectrum. In another embodiment, a second access point can use this information during channel selection.

The AI-ARRP device 120 can be integrated into the Wi-Fi controller 110, in an embodiment. The AI-ARRP 120 device can also be a separate server, in other embodiments. One benefit of the integrated embodiment is direct access to network information, rather than over a network and through security. The AI-ARRP device 120 assigns stations to access points, based on a match in bandwidth capability. In some embodiments, 160 MHz devices are first matched for network availability, 80 MHz devices are secondly matched for network availability, then 40 MHz devices, and if need be, lastly 20 MHz devices. Many variations are possible, a single example is given only for conciseness. More details for the AI-ARRP device 120 are set forth below with respect to FIG. 2.

The access points 101A-D provide channels of various bandwidths for stations to join for access to the Internet (see, e.g., FIG. 1A). The 160 MHz bandwidth channels can operate under IEEE 802.11, or more specifically IEEE 802.11AX (or Wi-Fi 6), over allowed frequencies. The access points 101A-D can also have combinations of 80 MHz, 40 MHz and 20 MHz bandwidth channels available for stations. Two 80 MHz channels can be combined to provide a 160 MHz channel, albeit with additional overhead and processor hardware. In one example, the access points 101A-D are hardware built for beamforming for bi-directional MU-MIMO (multiple-user, multiple input, multiple output) with multiple antennae in, for example, 2×2, 3×3, 4×4 or 8×8 stream variations. Different modulation schemes can be implemented, such as QAM and OFDMA (orthogonal frequency division multiple access). Downshifting from 5 GHz to 2.4 GHz can occur if necessary.

The access points 101A-D can change modes from servicing stations to detecting available spectrum, periodically. In more detail, the access points 101A-D can use several virtual access points logically separated (e.g., by dedicated software virtual machines and/or dedicated hardware processor cores) to host several SSIDs rather than just one SSID. This allows each device to set up a virtual access point designated for radar detection with an SSID exclusively for radar detection.

The stations 102A-D are preferably enabled for 6 GHz spectrums with an appropriate Wi-Fi processor and are able to downgrade when the maximum bandwidth is not available. The stations 102A-D can also be enabled for 160 MHZ, 80 MHz, 40 MHz or 20 MHz channel bandwidths. In one example, the stations 102A-D include MU-MIMO capable for dense environments. Transceivers of the stations 102A-D send a probe request to join a Wi-Fi network and receive available SSIDs. The stations 102A-D can be unaware of transparent reconfigurations upstream on the network, as to which access point is servicing a particular station. Any designated access point within range can respond to a particular stations and other access points can ignore the particular stations (e.g., by MAC address). One embodiment of the stations 120A-D includes spectrum switchers. The mechanism can reconfigure a station for a spectrum provided by the network.

Figure 4:
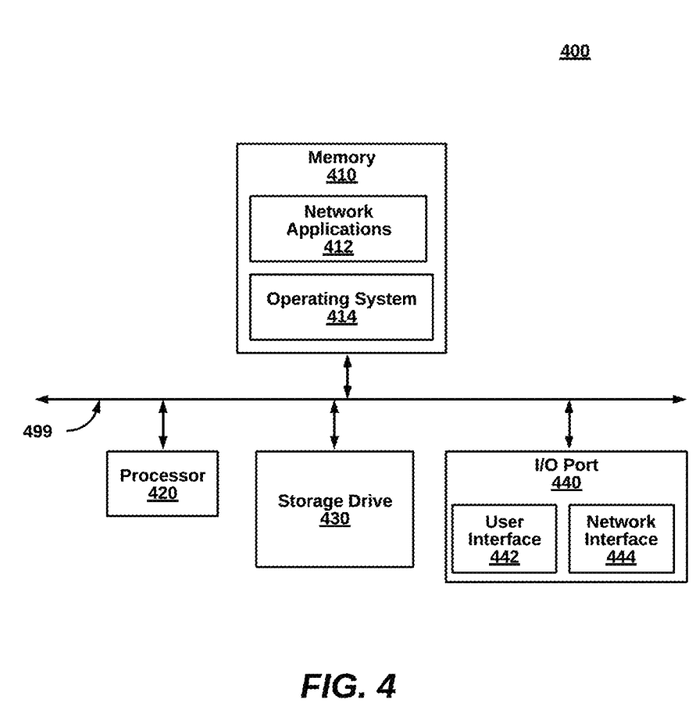
FIG. 4 is a block diagram illustrating an example computing device, according to one embodiment.

The network components of the system 100 can implemented in any of the computing devices discussed herein, for example, a personal computer, a laptop computer, a tablet computer, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 4).

FIG. 2 is a more detailed block diagram illustrating the AI-ARRPARRP device 120 of the system of FIG. 1, respectively, according to one embodiment. The Wi-Fi controller 110 comprises a radar detection module 210, a channel manager 220, a machine learning module 230, and a network communication module 240. The components can be implemented in hardware, software, or a combination of both.

The 6 GHz assignment module 210 receives a list of non-overlapping 6 GHz channels available on the Wi-Fi network for the plurality of access points, for example, from the access point manager 220. At least one 6 GHz station that is muted on the Wi-Fi network within the plurality of stations on a first access point within the plurality of access points is detected. The first access point is also capable of 6 GHz but is has downshifted to operate as 5 GHz or 2.4 GHz due to servicing at least one non-6 GHz station. RSSI measurements is received for neighboring access points to the at least one 6 GHz station. The 6 GHz assignment module 210 assigns 6 GHz stations assigned to a first access point from the plurality of access points associated with list of non-overlapping 6 GHz channels, responsive to an RSSI value between the at least one 6 GHz station and the first access point. To do so, a channel switch announcement is unicast to the at least one muted 6 GHz station. The channel switch announcement is associated with a non-overlapping 6 GHz channel of the first access point. The remaining stations connected to the first access point are deauthenticated.

Many other embodiments are possible. For example, a different algorithm can be implemented for 5 GHz AI, and still a different algorithm for various bandwidths of 160 MHz, 80 MHz, and 40 MHz. In some cases, the 6 GHz device stays at the same access point as it changes modes from 5 GHz up to 6 GHz and deauthenticates others.

The access point manager 220 manages the access points 101A-D and indirectly manages connected stations 102A-D, with respect to network access and type of access, in an embodiment. SSIDs (service set identifiers) can be assigned to and unassigned from an access point. Additionally, when stations are handed-off from one access point to another access point, the SSID can follow the station to different access points, for example, as implemented in the virtual port feature by Fortinet, Inc. of Sunnyvale, Calif. When stations change access points, the access point manager can keep connection parameters and security consistent. Thus, the access point manager can compel station configurations and behaviors that may not occur naturally, rather than allowing stations to choose access points as they usually do under IEEE 802.11 standards.

The machine learning module 230 reassigns stations to recover lost bandwidth, on one embodiment. In doing so, real-time conditions are use against statistical models to determine the best arrangement. Adaptations are made based on feedback from actual connections by stations. Network statistics can be stored for training models for the machine learning module 230.

The network communication module 240 can provide network protocol services and lower layer services for packetizing data according to Ethernet or other protocols. The network communication module 240 can include transceivers with modulators, antennae and drivers to exchange data with a physical medium. An operating system can interface applications executing on stations with network services.

II. Methods for Artificially Intelligent Frequency Channel Selection (FIG. 3)

Figure 3:
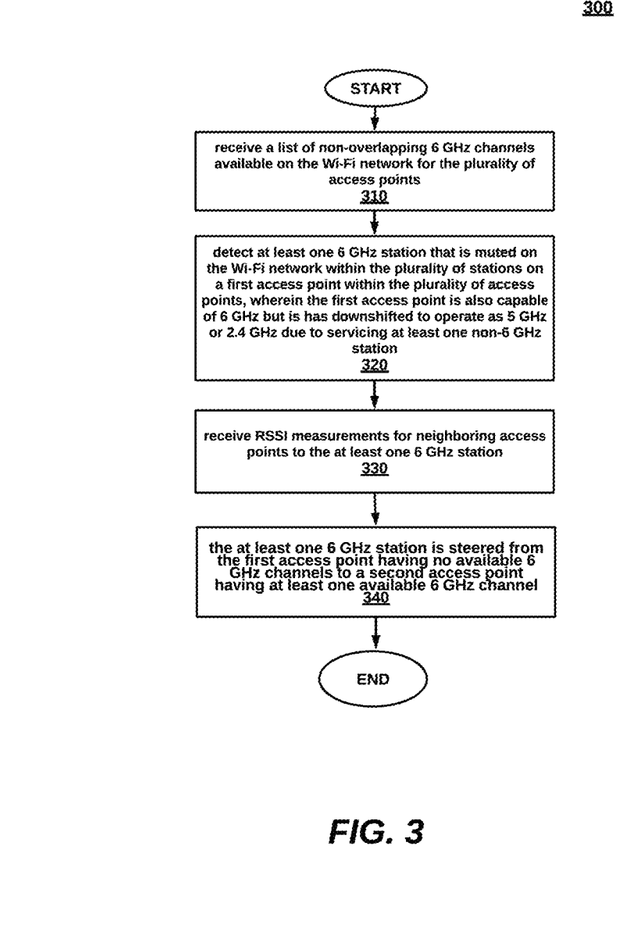
FIG. 3 is a high-level flow diagram illustrating a method for using artificial intelligence for dynamically steering stations with 6 GHz spectrum capability based on spectrum availability, according to one embodiment.

FIG. 3 is a high-level flow diagram illustrating a method for using artificial intelligence for dynamically steering stations with 60 GHz spectrum capability based on spectrum availability, according to one embodiment. The method 300 can be implemented, for example, by the system 100 of FIG. 1. The steps are merely representative groupings of functionality, as there can be more or fewer steps, and the steps can be performed in different orders. Many other variations of the method 300 are possible.

At step 310, a list of non-overlapping 6 GHz channels available on the Wi-Fi network for the plurality of access points is received.

At step 320, at least one 6 GHz station that is muted on the Wi-Fi network within the plurality of stations on a first access point within the plurality of access points is detected. The first access point is also capable of 6 GHz but is has downshifted to operate as 5 GHz or 2.4 GHz due to servicing at least one non-6 GHz station.

At step 330, RSSI measurements is received for neighboring access points to the at least one 6 GHz station.

At step 340, the 6 Hz station is steered from the first access point with no available 6 GHz channels to a second access point having at least one available 6 GHz channel. To do so, the at least one 6 GHz station is assigned to a first access point from the plurality of access points associated with list of non-overlapping 6 GHz channels, responsive to an RSSI value between the at least one 6 GHz station and the first access point. To do so, a channel switch announcement is unicast to the at least one muted 6 GHz station. The channel switch announcement is associated with a non-overlapping 6 GHz channel of the first access point. The remaining stations connected to the first access point are deauthenticated. One alternative embodiment uses the method 300 for 6 GHz devices in combination with the method of U.S. application Ser. No. 16/724,335, hereby incorporated by reference in its entirety, for 5 GHz devices.

III. Generic Computing Device (FIG. 4)

FIG. 4 is a block diagram illustrating an example computing device 400 for use in the system 100 of FIG. 1, according to one embodiment. The computing device 400 is implementable for each of the components of the system 100. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 430, and an I/O port 440. Each of the components is coupled for electronic communication via a bus 499. Communication can be digital and/or analog, and use any suitable protocol.

The memory 410 further comprises network applications 412 and an operating system 414. The network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 420 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a Wi-Fi controller coupled to a plurality of access points on a data communication network, for artificially intelligent automatic radio resource provisioning (AI-ARRP) based on 6 GHz spectrum availability of a Wi-Fi network and based on 6 GHz spectrum capability of a plurality of stations connected to the plurality of access points, the method comprising the steps of:

receiving a list of non-overlapping 6 GHz channels available on the Wi-Fi network for the plurality of access points;

detecting at least one 6 GHz station that is muted on the Wi-Fi network within the plurality of stations on a first access point within the plurality of access points, wherein the first access point is also capable of 6 GHz but is has downshifted to operate as 5 GHz or 2.4 GHz due to servicing at least one non-6 GHz station;

receiving RSSI measurements for neighboring access points to the at least one 6 GHz station;

assigning the at least one 6 GHz station to a first access point from the plurality of access points associated with list of non-overlapping 6 GHz channels, responsive to an RSSI value between the at least one 6 GHz station and the first access point;

unicasting a channel switch announcement to the at least one muted 6 GHz station, wherein the channel switch announcement is associated with a non-overlapping 6 GHz channel of the first access point; and deauthenticating remaining stations connected to the first access point without 6 GHz capability.

2. The method of claim 1, wherein the detecting step comprises:

parsing a probe request for the plurality of stations to determine spectral capability of the at least one 6 GHz station.

3. The method of claim 1, wherein the RSSI value is higher than at least one other RSSI value list of non-overlapping 6 GHz channels.

4. The method of claim 1, wherein the RSSI value exceeds a minimum value.

5. The method of claim 1, wherein the Wi-Fi operates under channels 36 through 64 and channels 100 through 128, as DFS enabled.

6. The method of claim 1, wherein the Wi-Fi is capable of communications compliant with IEEE 802.11AX.

7. A non-transitory computer-readable media storing source code that, when executed by a processor, performs a computer-implemented method, in an access point on a data communication network and implemented at least partially in hardware, for artificially intelligent automatic radio resource provisioning (AI-ARRP) based on 6 GHz spectrum availability of a Wi-Fi network and based on 6 GHz spectrum capability of a plurality of stations connected to a plurality of access points for AI-ARRP, the method comprising the steps of:

receiving a list of non-overlapping 6 GHz channels available on the Wi-Fi network for the plurality of access points;

detecting at least one 6 GHz station that is muted on the Wi-Fi network within the plurality of stations on a first access point within the plurality of access points, wherein the first access point is also capable of 6 GHz but is has downshifted to operate as 5 GHz or 2.4 GHz due to servicing at least one non-6 GHz station;

receiving RSSI measurements for neighboring access points to the at least one 6 GHz station;

assigning the at least one 6 GHz station to a first access point from the plurality of access points associated with list of non-overlapping 6 GHz channels, responsive to an RSSI value between the at least one 6 GHz station and the first access point;

unicasting a channel switch announcement to the at least one muted 6 GHz station, wherein the channel switch announcement is associated with a non-overlapping 6 GHz channel of the first access point; and deauthenticating remaining stations connected to the first access point without 6 GHz capability.

8. A method, in an access point on a data communication network and implemented at least partially in hardware, for artificially intelligent automatic radio resource provisioning (AI-ARRP) based on 6 GHz spectrum availability of a Wi-Fi network and based on 6 GHz spectrum capability of a plurality of stations connected to a plurality of access points for AI-ARRP, the method comprising the steps of:

receiving a list of non-overlapping 6 GHz channels available on the Wi-Fi network for the plurality of access points;

detecting at least one 6 GHz station that is muted on the Wi-Fi network within the plurality of stations on a first access point within the plurality of access points, wherein the first access point is also capable of 6 GHz but is has downshifted to operate as 5 GHz or 2.4 GHz due to servicing at least one non-6 GHz station;

receiving RSSI measurements for neighboring access points to the at least one 6 GHz station;

assigning the at least one 6 GHz station to a first access point from the plurality of access points associated with list of non-overlapping 6 GHz channels, responsive to an RSSI value between the at least one 6 GHz station and the first access point;

unicasting a channel switch announcement to the at least one muted 6 GHz station, wherein the channel switch announcement is associated with a non-overlapping 6 GHz channel of the first access point; and deauthenticating remaining stations connected to the first access point without 6 GHz capability.

* * * * *